(12) United States Patent
Bieber et al.

(10) Patent No.: US 9,695,890 B2
(45) Date of Patent: Jul. 4, 2017

(54) METHOD FOR DETERMINING THE DRAINAGE CONTROL OF A HYDRAULIC SWITCHING ELEMENT OF A TRANSMISSION

(71) Applicant: ZF Friedrichshafen AG, Friedrichshafen (DE)

(72) Inventors: Sven Bieber, Bermatingen (DE); Jan-Frederik Kuhn, Friedrichshafen (DE); Marcus Hiemer, Meckenbeuren (DE); Stephan Schinacher, Egesheim (DE); Mario Brugger, Tettnang (DE); Markus Lukassek, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 80 days.

(21) Appl. No.: 14/934,259

(22) Filed: Nov. 6, 2015

(65) Prior Publication Data

US 2016/0131249 A1    May 12, 2016

(30) Foreign Application Priority Data

Nov. 11, 2014   (DE) .......................... 10 2014 222 947

(51) Int. Cl.
    *F16D 48/06*    (2006.01)
(52) U.S. Cl.
    CPC .. *F16D 48/066* (2013.01); *F16D 2500/30426* (2013.01); *F16D 2500/30816* (2013.01); *F16D 2500/3166* (2013.01); *F16D 2500/5014* (2013.01); *F16D 2500/5016* (2013.01)
(58) Field of Classification Search
    None
    See application file for complete search history.

(56) References Cited

U.S. PATENT DOCUMENTS

| | | | | |
|---|---|---|---|---|
| 5,737,979 A | * | 4/1998 | McKenzie | ............ F16H 61/061 74/731.1 |
| 2004/0209737 A1 | * | 10/2004 | Lee | ........................ F16H 61/061 477/174 |
| 2014/0277978 A1 | * | 9/2014 | Versteyhe | ............. F16D 48/066 701/68 |

FOREIGN PATENT DOCUMENTS

DE        101 51 537 A1    5/2003

* cited by examiner

*Primary Examiner* — Ramya Burgess
*Assistant Examiner* — Timothy M Hannon
(74) *Attorney, Agent, or Firm* — Davis & Bujold, PLLC; Michael J. Bujold

(57) ABSTRACT

A method for determining a draining behavior of a hydraulically actuated transmission shifting element. By applying actuating pressure, the shifting element is changed from a completely drained, open operating condition to a completely filled closed operating condition, and the reference filling time, until the closed condition has been reached, is determined. Upon recognition of the closed condition, then by adjusting the actuating pressure for a predefined draining time, the shifting element is changed to its open condition and, thereafter, again completely filled and closed. Upon recognition of the closed condition, the shifting element is actuated direction toward the open condition by reducing the actuating pressure. Then, before completely opening, the shifting element is again returned to its closed operating condition and the filling time, until the partially drained shifting element has reached the completely filled and closed operating condition, is determined.

10 Claims, 7 Drawing Sheets

METHOD FOR DETERMINING THE DRAINAGE CONTROL OF A HYDRAULIC SWITCHING ELEMENT OF A TRANSMISSION

This application claims priority from German patent application serial no. 10 2014 222 947.2 filed Nov. 11, 2014.

FIELD OF THE INVENTION

The invention concerns a method for determining a draining behavior of a hydraulically actuated shifting element of a transmission.

BACKGROUND OF THE INVENTION

In continuously variable power-branched transmissions or building machine transmissions known from practice, hydraulically actuated frictional shifting elements are commonly used, which in the area of a piston chamber are filled with hydraulic fluid and acted upon by appropriate actuation pressure. The extent of filling of a piston chamber of such a shifting element significantly influences the transmission capacity of the shifting element and the torque that can be transmitted by the shifting element concerned at the time. In addition, the actuation sequence of a shifting element affects its closing behavior and thus also the shifting comfort, which is determined decisively by the torque applied in each case in the area of a drive output of a vehicle, or the variation thereof.

Since, as is known, manufacturing tolerances of mass-produced components used in shifting elements and hydraulic lines can sometimes show an undesirable degree of scatter, for each shifting element of a transmission an individual calibration should be carried out in order to know the particular filling behavior of the shifting elements and to be able to actuate the shifting element so as to achieve an appropriate level of shifting comfort. The parameters that characterize the clutch filling in each case and which are determined by the calibration are stored in the area of a non-volatile memory of a transmission control system and taken into account when carrying out the actuation of a shifting element during every gearshift.

In this context, two parameters in particular are characteristic for the filling behavior of a shifting element. The first parameter is the so-termed rapid filling time, during which a shifting element is acted upon by a so-termed rapid filling pulse in order to fill the shifting element within short operating times. The piston chamber of a shifting element is acted upon by a defined rapid filling pressure for the rapid filling time. The rapid filling phase is followed by a so-termed filling equalization phase, during which the actuation pressure applied in the area of the piston chamber falls from the level of the rapid filling pressure to a level of a filling equalization pressure that represents the second parameter, and remains there for a further, defined filling equalization time. At the end of the filling equalization phase, ideally the shifting element is in a defined operating condition in which the transmission capacity of the shifting element is essentially equal to zero, and starting from which, an increase of the actuation force of the shifting element results in an immediate increase of the transmission capacity of the shifting element.

In calibration methods known until now the rapid filling time is determined iteratively. For this, starting from a very short rapid filling time the rapid filling time is increased step by step until at the end of the rapid filling phase the shifting element transmits a torque. This operating condition of a shifting element can be verified in a simple manner as a function of a variety of rotational speed variations of components of the transmission. During this the rotational speed is monitored by a suitable recognition function. In each case the calibration process is based on the assumption that the shifting element whose rapid filling time is currently being calibrated changes to a completely drained operating condition between the individual iteration steps for determining the rapid filling times.

However, besides the filling behavior the draining behavior as well has a decisive influence on the quality of gearshifts. This results from the fact that particularly in the case of building machines one and the same clutch is engaged rapidly in succession in the force flow of a vehicle drive-train, which is the case particularly when several reversing processes are carried out one after another. If one and the same clutch is engaged and disengaged in each case after the passage of very short operating times, it is possible that the clutch will not drain completely before being re-engaged, and therefore has to be engaged again from a so-termed partially filled operating condition. This, however, has the result that previously known engagement routines for respective shifting elements to be engaged are not suitable for preparing a shifting element to the extent required for a desired high comfort level of the engagement.

SUMMARY OF THE INVENTION

Accordingly, the purpose of the present invention is to provide a method for determining a draining behavior of a hydraulically actuated shifting element of a transmission, in order to be able to actuate even only partially drained shifting elements to an extent required for a high level of shifting comfort during an engagement process.

According to the invention, this objective is achieved by a method having the characteristics as described below.

In the method according to the invention for determining a draining behavior of a hydraulically actuated shifting element of a transmission, of which one shifting element half is functionally connected to a transmission input shaft that can be coupled to a drive engine whereas the other shifting element half can be connected to a drive output of a vehicle drive-train made with the transmission, if the rotational speed of the input shaft is higher than a threshold value and when the shifting element half is decoupled from the transmission output shaft, the shifting element is changed from an open and completely drained operating condition to a closed and completely full operating condition by applying an actuating pressure, and the reference filling time until that operating condition of the shifting element has been reached is determined. The closed condition of the shifting element is recognized when a rotational speed of the shifting element half that can be connected to the transmission output shaft reaches a predefined limit value because of the closed operating condition of the shifting element. When the closed operating condition of the shifting element is recognized, the shifting element is changed by adjusting the actuating pressure for a predefined draining time to the level of its completely drained and open condition, and thereafter the shifting element is again completely filled and closed. On recognizing the completely filled and closed operating condition the shifting element is again adjusted, by reducing the actuating pressure, in the direction toward its drained and open operating condition. But before reaching its completely drained and open operating condition the shifting element is thereafter changed again to its completely filled and closed operating condition, and at the same time the filling time is determined until the partially drained shifting element again reaches its completely filled and closed operating condition.

With the method according to the invention, in a simple manner the draining behavior of a shifting element, in particular that of reversing clutches of a continuously variable power-branched transmission, can be determined. The parameters determined by means of the method can be taken into account during the actuation of a shifting element, in order to improve the shifting quality in particular of reversing clutches of continuously variable power-branched transmissions. This is particularly advantageous in the case of gearshifts taking place in rapid succession, since by taking account of the draining time of a shifting element substantially better shifting behavior can be achieved. By using the method, for the first time the scatter of mass-produced shifting elements can be taken into account explicitly in the area of the hydraulic control system.

In the method according to the invention a recognition function monitors the secondary-side rotational speed of the shifting element. If the shifting element changes to its closed operating condition, the shifting element half that can be connected to the transmission output rotates essentially at the rotational speed of the shifting element half connected to the transmission input shaft and a rotational speed sensor preferably arranged on the drive output side determines by measurement technology a rotational speed increase of the rotational speed of the shifting element half on the drive output side.

Furthermore, during the method, in the area of the shifting element a correspondingly higher actuating pressure is applied until the rotational speed on the secondary side of the shifting element exceeds the limit value. It is then recognized that the shifting element has been filled sufficiently to transmit torque. The time lapsed until then is stored in a transmission control system as the reference filling time. Thereafter, the actuating pressure is adjusted to a level such that the shifting element is definitively drained completely. Again thereafter, the shifting element is completely refilled and the previously determined reference filling time is verified, whereby it is determined that the shifting element had previously actually been completely drained.

Additionally thereafter, during the actual draining time determination, starting from the completely full operating condition of the shifting element its draining time until the next filling process of the shifting element is substantially reduced, so that the shifting element does not have enough time to drain completely. By virtue of this procedure the actual draining behavior of a shifting element can be determined exactly with little effort and a method for filling and closing a shifting element to an extent required for a high level of shifting comfort can be adapted in a simple manner.

If the reference filling time is determined at least twice in succession, erroneous actuations of a shifting element due to measurement errors are avoided in a simple manner.

The method according to the invention can preferably be used with vehicle drive-trains having continuously variable power-branched transmissions, although it is also possible to use the method according to the invention with vehicle drive-trains having shifting clutches, such as transmissions having a hydrodynamic torque converter, preferably with a closed converter bridging clutch. In such cases the transmission also has a frictional shifting element.

In an advantageous variant of the method according to the invention, after the lapse of a predefined draining time the shifting element is again returned to its completely filled and closed operating condition, so that with reference to the ratio between the filling time so determined and the reference filling time the filling extent of the shifting element after the lapse of the predefined draining time is determined with little effort.

In a further advantageous variant of the method according to the invention, the filling extent of the shifting element is determined iteratively until the draining time that corresponds to a predetermined filling extent of the shifting element is determined.

In a further variant of the method according to the invention, the filling extent of the shifting element is determined iteratively until the draining time required until the completely drained and open operating condition of the shifting element has been determined, whereby the shifting element can be actuated with greater precision.

In a variant of the method according to the invention that can be carried out with little effort, a characteristic curve that pictures the draining behavior of the shifting element is determined by linear interpolation between the completely filled and closed operating condition which the shifting element is in after a draining time equal to zero, the completely drained and open operating condition of the shifting element which it is in after the lapse of the draining time, and an intermediate value of the filling extent determined at a draining time corresponding thereto.

Depending on the application concerned, a characteristic curve that represents the draining behavior of a shifting element as a second-order polynomial is used, which is determined as a function of the completely filled and closed operating condition in which the shifting element is after a draining time equal to zero, the completely drained and open condition of the shifting element which it is in after the lapse of the draining time, and an intermediate value of the filling extent determined after a draining time corresponding thereto.

In an advantageous variant of the method according to the invention, the filling extent of the shifting element that corresponds to a predefined draining time and/or the draining time that corresponds to a predefined filling extent of the shifting element, is or are adapted as a function of the rotational speed of the transmission input shaft and/or the operating temperature of the transmission, whereby the actuation of a shifting element can be carried out over the full operating range of a transmission to an extent required for a high level of shifting comfort.

In a simply implemented variant of the method according to the invention, to be able to actuate a shifting element to an extent required for a high level of shifting comfort, a rapid filling time and/or a pressure level of the actuating pressure of the shifting element during a rapid filling phase of the shifting element is adapted, with reference to the characteristic curve, to the filling extent of the shifting element determined at the beginning of the rapid filling phase by means of the characteristic curve.

In this case it is possible for the pressure level of the actuating pressure and/or the rapid filling time to be reduced as a function of the filling extent of the shifting element determined in each case at the beginning of the rapid filling phase.

The characteristics emerging from the example embodiment of the object of the invention described below are in each case suitable, whether considered in isolation or in any combination with one another, as further developments of the object of the invention.

BRIEF DESCRIPTION OF THE DRAWINGS

Further advantages and advantageous further developments of the invention emerge from the claims and the example embodiments whose principle is described with reference to the drawing, which shows:

DETAILED DESCRIPTION OF THE PREFERRED EMBODIMENTS

Figure 1:
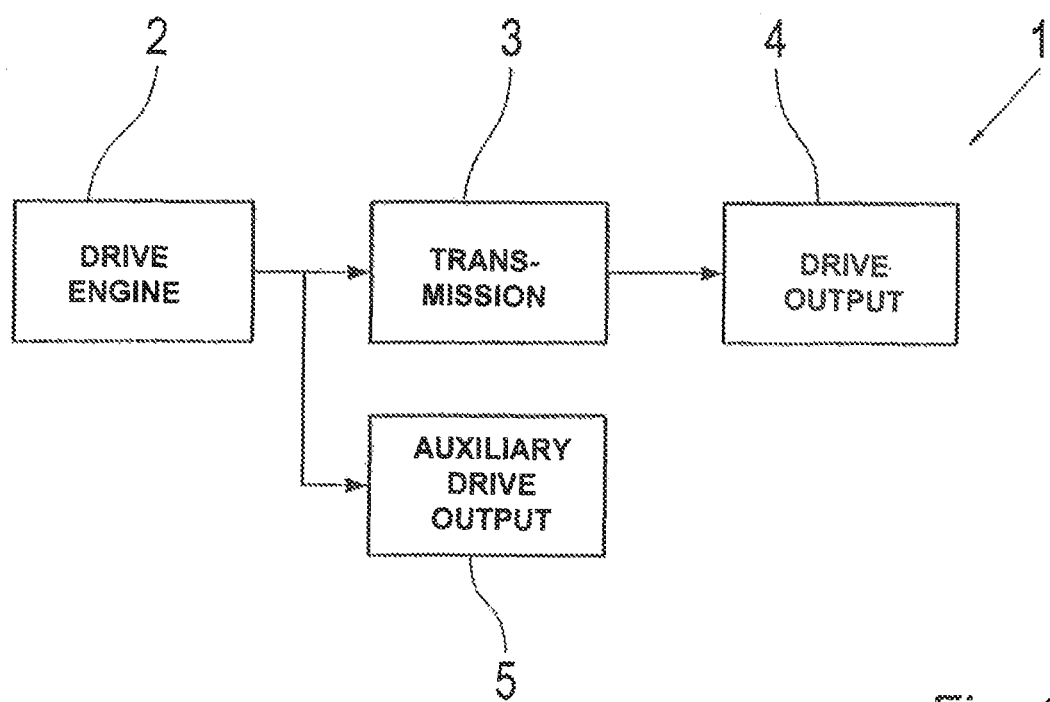
FIG. 1: A very schematic block diagram of a vehicle drive-train having a continuously variable power-branched transmission.

FIG. 1 shows a schematic representation of a vehicle drive-train with a drive engine 2 and with a transmission 3 that can be coupled thereto and that is in the form of a continuously variable power-branched transmission. The drive engine 2 is in this case in the form of an internal combustion engine, preferably a diesel engine, and in other embodiments of the vehicle drive-train 1 could also be an electric machine or a combination of an internal combustion engine of any type and an electric machine.

On the transmission output side, the transmission 3 is functionally connected to a drive output 4, whereby drive torque provided by the drive engine 2, correspondingly converted as a function of the gear ratio set in the area of the transmission 3, is transmitted as a corresponding traction force in the area of the drive output 4. In the area between the drive engine 2 and the transmission 3, an auxiliary drive output 5 or a working hydraulic system can be acted upon by torque from the drive engine 2.

Figure 2:
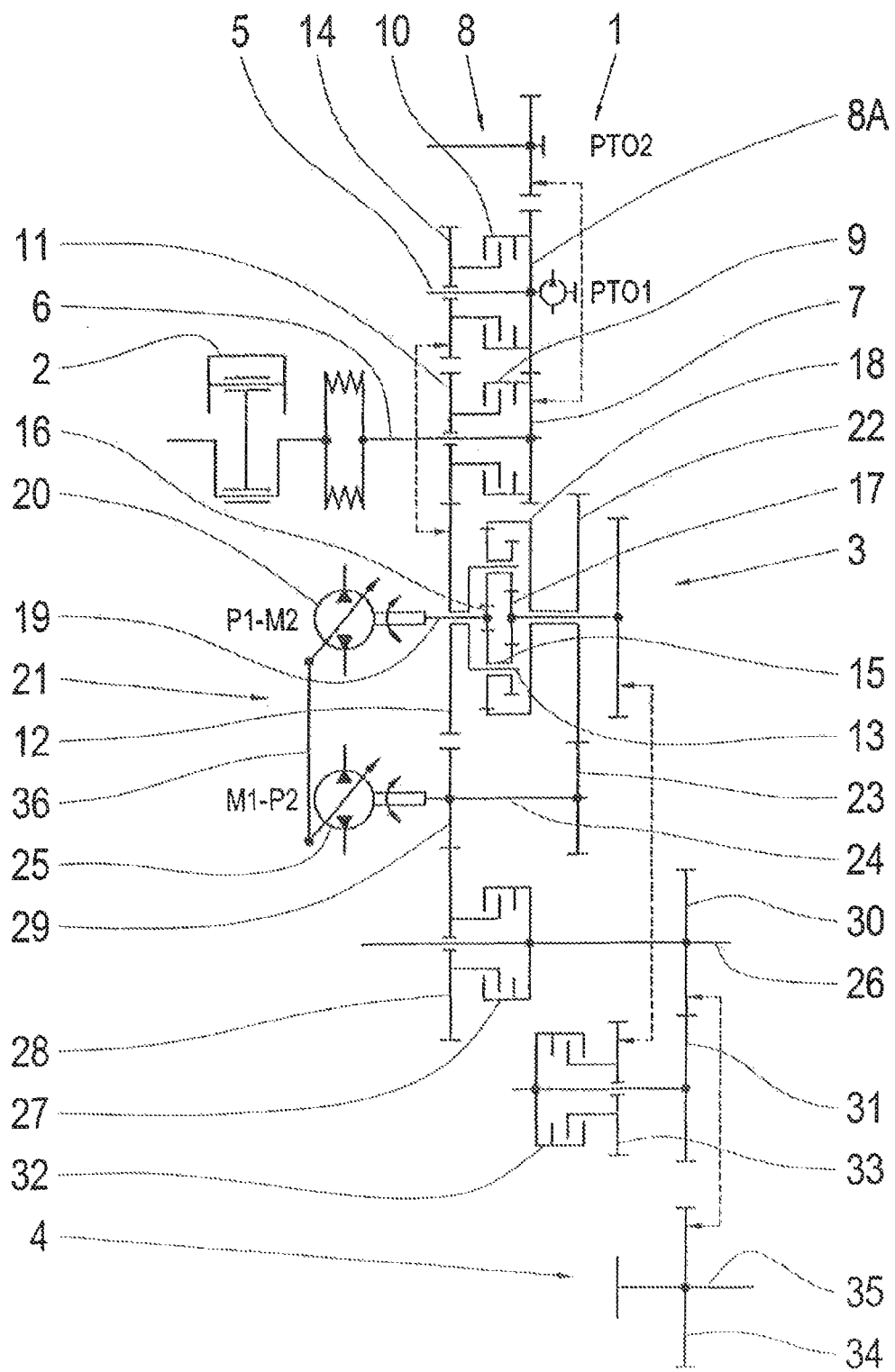
FIG. 2: A gearwheel layout of a continuously variable power-branched transmission.

FIG. 2 shows a gearwheel layout of a possible embodiment of the transmission 3 according to FIG. 1, which is connected in a rotationally fixed manner to the drive engine 2 in the area of a transmission input shaft or transmission input 6. By way of a fixed wheel 7 and a fixed wheel 8A, the transmission input shaft 6 drives the auxiliary drive output 5, a further auxiliary drive output 8 and the first shifting element halves of frictional shifting elements 9, 10. The frictional shifting element 9 is arranged coaxially with the transmission input shaft 6, whereas the frictional shifting element 10 or the driving direction clutch for reversing is positioned on the shaft of the auxiliary drive output 5 arranged coaxially with the transmission input shaft 6. In the closed operating condition of the frictional shifting element 9 or driving direction clutch for forward driving the transmission input shaft 6 drives, by way of a loose wheel 11 mounted to rotate on the transmission input shaft 6, a loose wheel 12 which is coupled in a rotationally fixed manner to a planetary carrier 13. In the closed operating condition of the frictional shifting element 10, the transmission input shaft 6 drives the loose wheel 12 by way of a loose wheel 14.

Mounted to rotate on the planetary carrier 13 are a number of double planetary gearwheels 15. The double planetary gearwheels 15 mesh with a first sun gear 16 and a second sun gear 17 as well as with a ring gear 18. The first sun gear 16 is connected in a rotationally fixed manner to a shaft 19 of a first hydraulic unit 20 of a hydrostatic unit 21. The ring gear 18 is functionally connected by way of a fixed wheel 22 and a fixed wheel 23 to a shaft 24 of a second hydraulic unit 25 of the hydrostatic unit 21.

In the area of the continuously variable power-branched transmission 3, several gear ratio ranges can be set, within which in turn the gear ratio of the transmission 3 can be varied continuously by adjusting the hydrostatic unit 21. Regardless of the representation in FIG. 2, the transmission 3 can be designed both as a primarily and as a secondarily coupled continuously variable power-branched transmission, wherein the power branching can take place both hydraulically and electrically or by a combination of the two.

A transmission output or transmission output shaft 26 of the transmission 3 can be connected by way of a frictional shifting element 27 arranged coaxially with the transmission output shaft 26 for a first driving range of the transmission 3, a loose wheel 28 and a fixed wheel 29, to the second shaft 24 of the hydrostatic unit 21. In addition, the transmission output shaft 26 can be coupled by way of a fixed wheel 30, a fixed wheel 31 and a further frictional shifting element 32 for a second driving range of the transmission 3, as well as a loose wheel 33 and a fixed wheel 34, to the second sun gear 17. The fixed wheel 34 is arranged coaxially with the second sun gear 17, whereas the fixed wheel 31, the frictional shifting element 32 for the second driving range and the loose wheel 33 are arranged coaxially with one another. The fixed wheel 30, the frictional shifting element 27 for the first driving range and the loose wheel 28, in turn, are arranged coaxially with the transmission output shaft 26. In addition the fixed wheel 30 meshes both with the fixed wheel 31 and with the fixed wheel 34 of a shaft 35, which in turn can be connected to the driven vehicle axle or with several driven vehicle axles of the drive output 4.

The driving direction clutches 9 and 10 are in this case wet-operating clutches, which are provided not only to produce the force flow between the drive engine 2 and the drive output 4, but at the same time also to determine the driving direction. In accordance with their capacitative design the frictional shifting elements 9 and 10 of the vehicle drive-train 1 according to FIG. 2 can also be used as starting elements. This is the case when, starting from a neutral operating condition of the transmission 3 in which the shifting elements 27 and 32 are open, a driver engages a driving direction and at the same time actuates an accelerator pedal to produce a desired speed. In the present case the frictional shifting elements 9 and 10 are designed in such manner that by means of them, even a driving direction change or a so-termed reversing process starting from higher driving speeds in the forward or reverse direction is possible.

During such a reversing process, starting from the current vehicle speed the vehicle speed is first reduced toward zero, and for this both the transmission capacity of the frictional shifting element 9 and also the transmission capacity of the frictional shifting element 10 are adjusted to the corresponding extent. During the reversing process the two frictional shifting elements 9 and 10 are mainly operated in a slipping mode. When the vehicle's speed is essentially equal to zero, the transmission capacities of the two shifting elements 9 and 10 are adjusted in such manner that the vehicle starts driving in the direction opposite to its previous driving direction until the required driving speed is reached.

To be able to carry out a starting process within short operating times and essentially without delay beginning from when the vehicle is at rest and the transmission 3 is in its neutral operating condition, the shifting element 27 of the first gear ratio range of the transmission 3 is closed and in addition the shifting element 9 or the shifting element 10 is changed respectively to its closed operating condition depending on the driver's wish for forward or reverse driving at the time. During the engagement of the shifting element 27 and the shifting element 9 or 10, the two hydraulic units 20 and 25 are adjusted by means of an adjustable yoke 36 in such manner that in the area of the transmission 3 the desired starting gear ratio is set. For this, the transmission capacity of the frictional shifting element 9 or 10 is set to values greater than zero during the specification of the starting gear ratio, in order to be able to start a vehicle made with the vehicle drive-train 1 according to FIG. 1 already during a closing process of the frictional shifting element 9 or 10.

Figure 3:
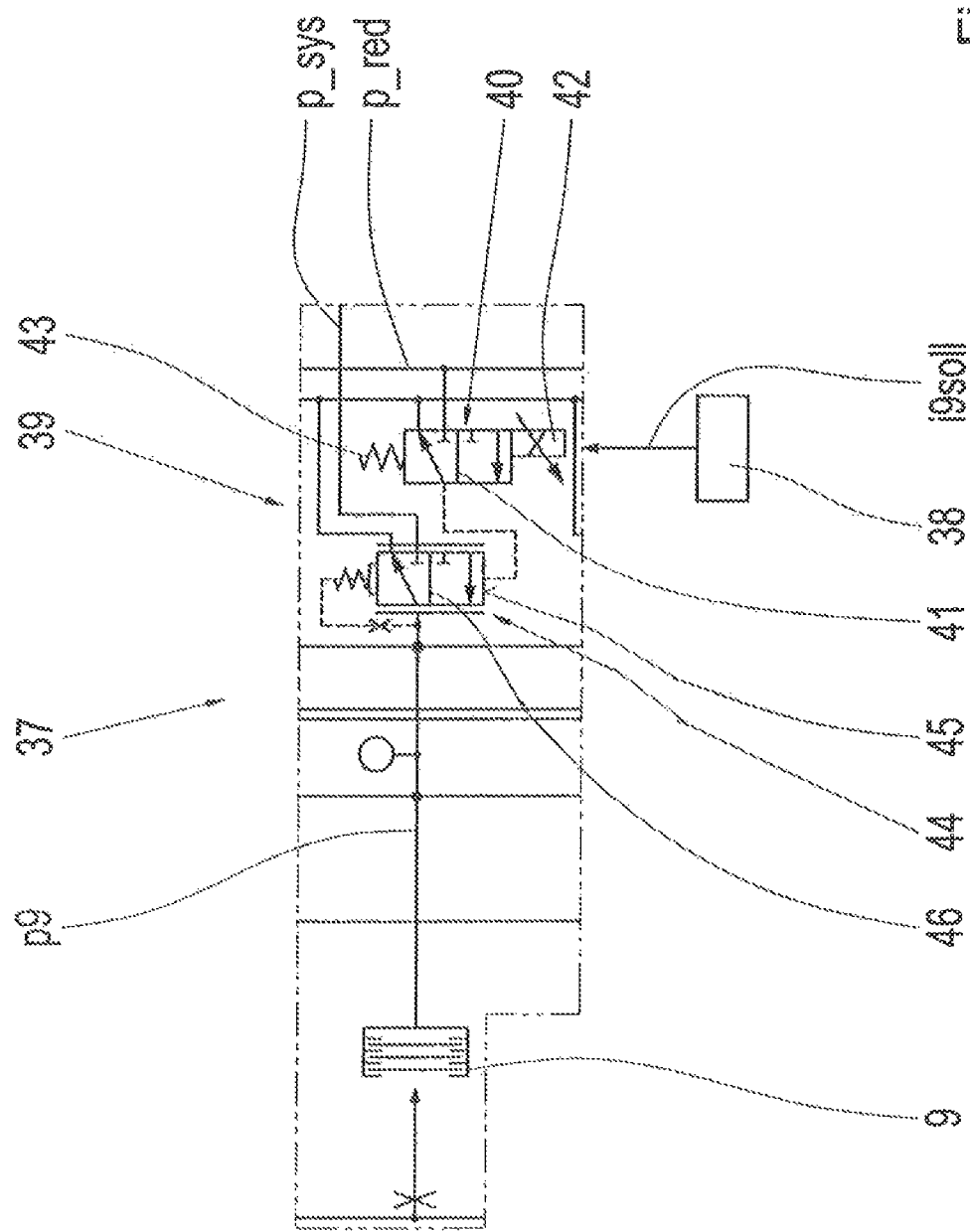
FIG. 3: An actuation chain of one of the shifting elements in the transmission according to FIG. 2.

FIG. 3 shows part of an electro-hydraulic control and regulation device 37 by means of which, among other things, the frictional shifting elements 9 and 10 can be actuated appropriately to produce the functionalities described above. In the present case, to actuate the shifting element 9, in the area of an electric control unit 38 a nominal value i9*soll* of the actuating current i9 of the shifting element 9 is emitted and applied in the area of a valve device 39. Thus, in the area of the valve device 39, as a function of the nominal value specification i9*soll* of the actuating current i9 an actuation pressure p9 is produced, which is applied in the area of the shifting element 9, namely in the area of a piston chamber of the shifting element 9.

In this case the valve device 39 comprises a proportional pressure regulator 40, whose valve slide 41 can be displaced by an electromagnet 42 against the spring force of a spring device 43. The electromagnet 42 is actuated as a function of the nominal value i9*soll* of the actuating current i9. In the area of the proportional pressure regulator 40 a supply pressure signal p_red or reducing pressure is applied, which, as a function of the nominal value i9*soll* of the actuating current i9, can be applied at the level appropriate in each case for actuating the shifting element 9, to a hydraulic amplifier 44 of the valve device 39 in the area of a control surface 45 of a valve slide 46 of the hydraulic amplifier 44. In addition, the hydraulic amplifier 44 is acted upon by a supply pressure signal p_sys which corresponds to a system pressure of a primary pressure circuit of the electro-hydraulic regulation device 37 and which, by virtue of the valve amplification in the area of the hydraulic amplifier 44, in this case increased by a factor of 2.7, can be applied at the shifting element 9 as the actuating pressure p9.

Depending on the application concerned, it can also be provided that the shifting element 9 is actuated directly by the system pressure p_sys, i.e. without the additional hydraulic amplifier, when the pressure is sufficiently high.

Since in building machines it is quite usual that one and the same clutch, or the shifting elements 9 and 10, are switched rapidly one after the other, as in the case of a rapid succession of driving direction reversals, the possibility exists that between two successive engagement processes that follow one another after a short time the shifting elements 9 and 10 will not drain to the extent required for an actuation process stored in a control device. In particular, depending on the current actual operating condition of the shifting elements 9 and 10, in order to be able to actuate one of the shifting elements 9 or 10 to the extent necessary for a high level of shifting comfort when the engagement of one of them is called for, the following procedure or the following calibration process is carried out. During the calibration process the draining behavior of the shifting elements 9 and 10 can be determined for the individual clutch and can then be taken into account when actuating the shifting elements. The parameters determined by means of the calibration process are then stored in the electro-hydraulic control and regulation device 37 and taken into account during the actuation of the shifting elements 9 and 10, whereby the shifting quality of the reversing clutches or the shifting elements 9 and 10 can be improved with little effort.

For a better understanding, the calibration process for determining the draining behavior of the shifting elements 9 and 10 is first explained in more detail with reference to the representation shown in FIG. 4, wherein the calibration process, which is carried out identically for the shifting elements 9 and 10, is for the sake of simplicity described below only with reference to the shifting element 9.

At a time-point T0, at which the calibration process begins, a so-termed recognition function monitors the rotational speed n11 of the shifting element half of the shifting element 9 that is coupled with the loose wheel 11 which can be brought, to the extent described earlier, by means of the frictional shifting element 27 or the frictional shifting element 32, into functional connection with the drive output. The rotational speed of the drive engine 2 when the calibration process is activated is higher than a threshold value, and the shifting element half of the shifting element 9 that is functionally connected to the transmission input shaft 6 rotates at the same rotational speed as the drive engine 2. Since both the shifting element 27 and the shifting element 32 are open, when the shifting element 9 is fully open, the shifting element half of the shifting element 9 coupled to the loose wheel 11 is at rest, so that by means of the recognition function a rotational speed n11 of this shifting element half essentially equal to zero is determined.

At time T0 the electric control unit 38 emits a nominal value i9*soll* of the actuating current i9 of the shifting element 9, and in the area of the clutch space the shifting element 9 is acted upon by an actuating pressure p9*zu* corresponding thereto. At that time the actuating pressure p9*zu* is increased abruptly in the manner shown in idealized form in FIG. 4, and is kept at the pressure level p9*zu*. With increasing operating time t the filling extent of the shifting element 9 increases, as also does its transmission capacity. In turn, this transmission capacity increase results in an increase of the rotational speed n11 of the shifting element half of the shifting element 9 connected rotationally fixed to the loose wheel 11. At a time T1 the rotational speed n11 of the shifting element half of the shifting element 9 exceeds a defined threshold value n11_schwell, which is determined empirically. At time T1 it is recognized that the shifting element 9 is filled sufficiently for a torque to be transmitted. From the difference between the times T1 and T0 the reference filling time tf is determined, which in the example considered in this case is equal to 250 ms.

Figure 4:
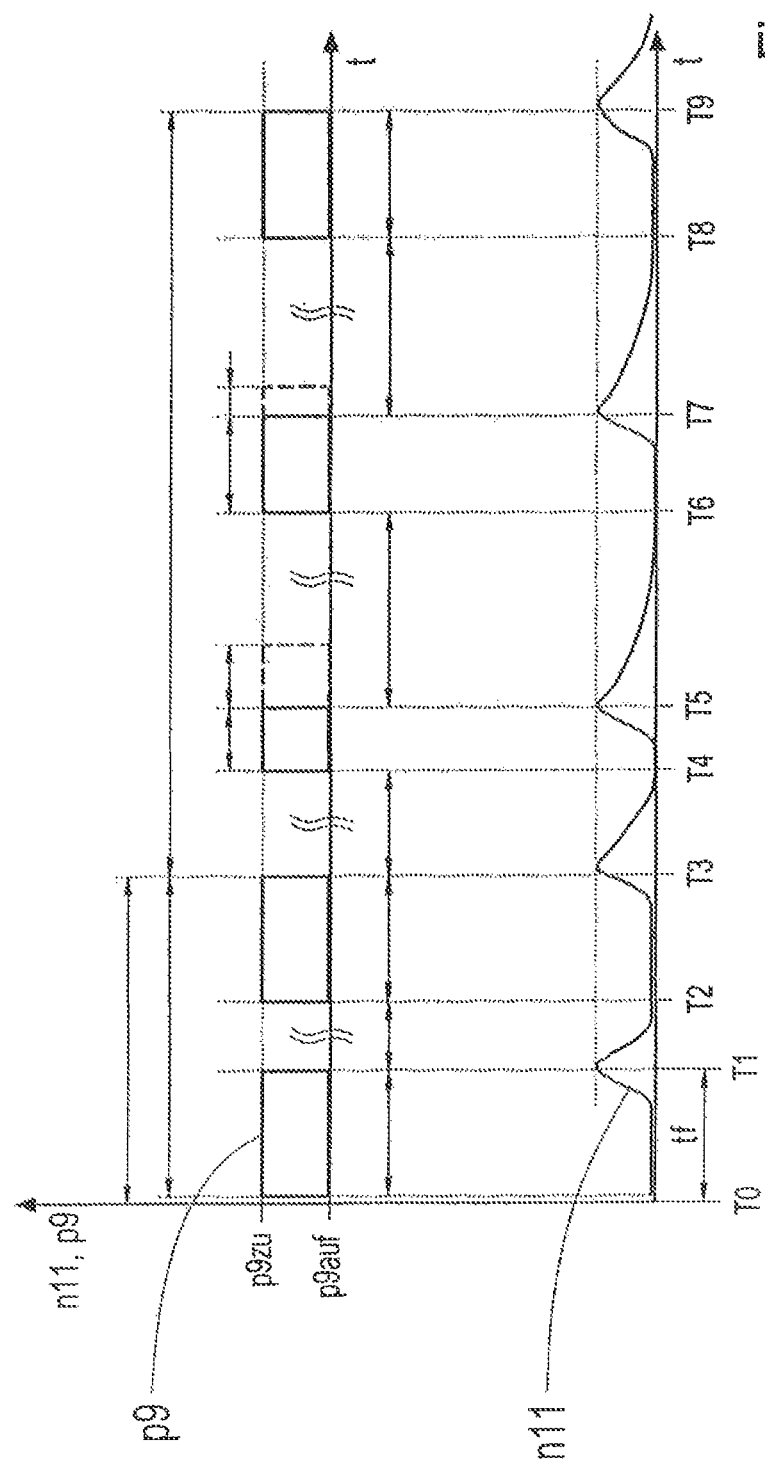
FIG. 4: A number of variations over time t of various operating condition parameters of the transmission according to FIG. 2, which occur while the procedure according to the invention is being carried out.

After the reference filling time tf has been determined, the nominal value i9*soll* of the actuating current i9 and thus the actuating pressure p9 is again reduced again abruptly to the extent shown in FIG. 4, to a value p9*auf* at which the shifting element 9 changes to its open operating condition. The nominal value i9*soll* of the actuating current i9 is in the present case kept at the current value that corresponds to the opening pressure level p9*auf* of the actuating pressure p9 for a time interval long enough for the shifting element 9 to have definitely drained completely. In the example considered in this case, the nominal value i9*soll* is set to that level for 10 s until time T2. From time T2 the nominal value i9*soll* of the actuating current i9 is increased abruptly to the same extent as at time T0 and the shifting element 9 is then acted upon by the actuating pressure p9*zu*.

At time T3 the rotational speed n11 of the shifting element half of the shifting element 9 again exceeds the threshold value n11_schwell and the time interval between times T3 and T2 is determined. If the time interval delimited by times T3 and T2 corresponds to the reference time tf determined at time T1, the reference phase, during which the reference filling time is determined, ends at time T3.

Depending on the application concerned, the reference filling time tf is determined after a single filling process of the shifting element 9 or after a number of filling processes of the shifting element 9 carried out in succession in such manner that between two respective filling processes in each case a waiting time long enough is allowed for the shifting element 9 to be in its completely open and drained operating condition before every new filling operation. Advantageously, tests have shown that a determination of the reference filling time tf is already accurate enough for the calibration process after a single filling process.

After the end of the reference phase, the actual draining time determination is started and the shifting element 9, already after the lapse of an interval of about 2 s after the time-point T2, at a time T4, is pressurized with the same actuating pressure p9*zu* as during the reference phase by applying the nominal value i9*soll* of the actuating current i9 to the proportional pressure regulator 40. The result of the shorter waiting time of 2 s is that at time T4 the piston chamber of the shifting element 9 is not completely drained and the rotational speed n11 of the shifting element half of the shifting element 9 exceeds the threshold value n11_schwell already after 125 ms. The actually determined filling time of 125 ms is divided by the previously determined reference filling time tf of 250 ms, so that the result corresponds to the residual filling extent of the shifting element 9 at time T4, which in the present example considered is equal to 50%.

Thereafter, further filling phases of the shifting element 9 are carried out in such manner that the draining time between the further filling phases of the shifting element 9 is increased step by step until one of the filling phases of the shifting element 9 again lasts as long as the full reference filling time tf until the shifting element 9 is completely filled.

In the iterative procedure for the determination of the draining time of the shifting element 9, illustrated as an example in FIG. 4, after the time-point T5 following the lapse of a draining time of 3 s the shifting element 9 is again acted upon by the pressure value p9*zu*. The rotational speed n11 of the shifting element half of the shifting element 9 exceeds the threshold value n11_schwell at time T7, which corresponds to a filling time of 187 ms. This means that after the lapse of the draining time of 3 s, or at time T6, the shifting element 9 still has a residual filling extent of 25%.

At time T7 the nominal value i9*soll* of the actuating current i9 is again reduced to the opening level of the shifting element 9. Thereafter, following the lapse of a draining time of 4 s, at time T8 the shifting element 9 is acted upon by the actuating pressure p9*zu*. At a time T9 the shifting element 9 changes to its completely filled and closed operating condition, since the rotational speed n11 of the shifting element half of the shifting element 9 then exceeds the threshold value n11_schwell. The interval between time-points T9 and T8 again corresponds to the reference filling time tf of 250 ms. The measurement values show that after the lapse of a draining time of between 3 and 4 s the shifting element 9 is completely drained. With the knowledge that the draining of the shifting element 9 takes between 3 and 4 s, the actual draining time of the shifting element 9 can be determined iteratively with great accuracy within that time interval with a reduced step width.

The abrupt change of the nominal value i9*soll* of the actuating current i9 and hence of the actuating current p9, shown in the present case, are only examples. It is at the discretion of those with knowledge of the field to vary the actuating current and hence also the actuating pressure of the shifting element 9 in other suitable ways, for example in a ramp-like manner.

Moreover, it is also possible for the values determined by the calibration process to be adapted as a function of various operating condition parameters, such as the rotational speed of the transmission input shaft 6, which corresponds essentially to the rotational speed of the drive engine, and the operating temperature of the transmission 3 at the time, and the shifting elements 9 and 10 can be actuated as a function of the adapted values.

After the determination of the draining time of the shifting elements 9 and 10 and if necessary carrying out an adaptation, the calibration values determined are stored in a non-volatile memory such as an EPROM or an EEPROM of the electro-hydraulic control and regulation unit, and used as parameters for the actuation of the shifting elements 9 and 10.

Figure 5:
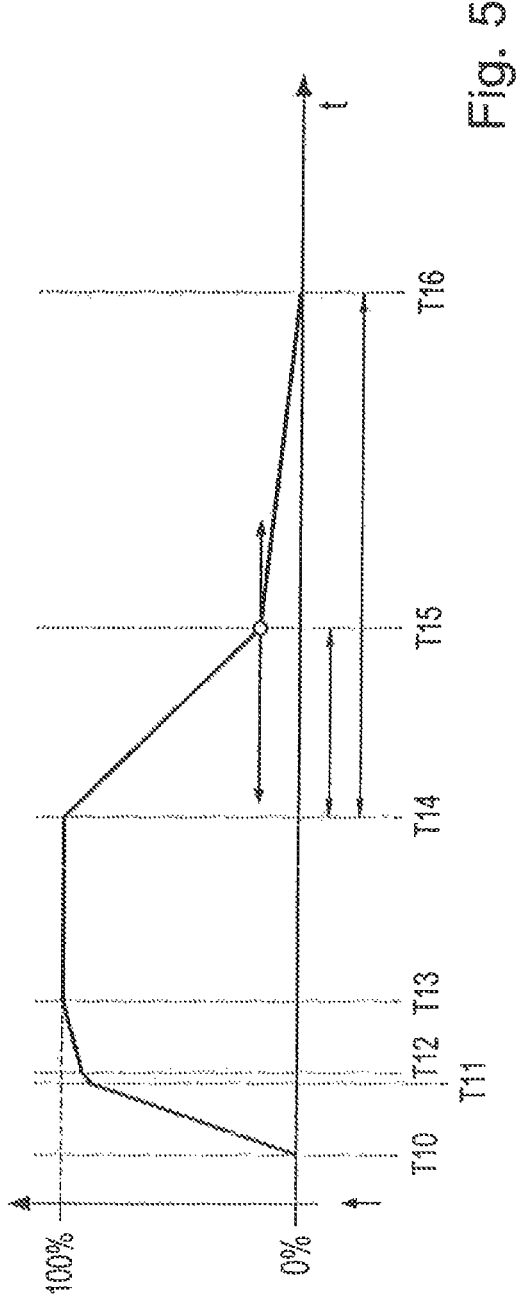
FIG. 5: The variation of a filling extent of a shifting element of the transmission according to FIG. 2, wherein the draining behavior of the shifting element is determined in accordance with a first variant of the method according to the invention.

FIG. 5 shows an example of a filling and draining characteristic curve for the shifting element 9 as a function of time t. Between the time-points T10 to T13 the characteristic curve represents the filling behavior of the shifting element 9 during a rapid filling phase and during a subsequent filling equalization phase. In addition the characteristic curve shows the draining behavior of the shifting element 9 after a time-point T14.

The filling behavior shown for the present case in FIG. 5 results from the procedure that at time T10 the completely drained shifting element 9 in its open operating condition is filled as rapidly as possible beginning at time T10, in a known manner during the rapid filling phase with a rapid filling pressure over a rapid filling time that ends in this case at time T11. From time T11 the rapid filling phase is followed by a so-termed filling equalization phase that extends until time T13 and during which the shifting element 9 is acted upon by a filling equalization pressure for an empirically determined filling equalization time.

Ideally, at the end of the filling equalization phase the shifting element 9 is in a defined operating condition in which its transmission capacity is equal to zero and starting from which a further increase of the actuating pressure p9 of the shifting element 9 results in an immediate increase of the transmission capacity of the shifting element 9. In any event, at time T13 the shifting element 9 is completely filled.

To establish the characteristic curve according to FIG. 5, first for a residual filling extent of the shifting element 9 of 25% the procedure described in connection with FIG. 4 is used to determine the corresponding draining time. In the example considered in FIG. 5, this draining time is equal to 3 s. In addition a time interval is determined, after the lapse of which the shifting element 9 is definitely completely drained. Thereafter, between the operating point at time T14, at which the shifting element 9 is completely filled, the operating point at time T15, i.e. 3 s after time T14 and at which the shifting element 9 has a residual filling extent of 25%, and a time T16 which follows 10 s after time T14 and at which the shifting element 9 is completely drained and open, linear interpolation is carried out and the draining curve shown in FIG. 5 as a function of time t is determined with little effort. During later operation of the transmission 3 or of a vehicle drive-train constructed with the transmission 3, the shifting element 9 can be actuated as a function of such a characteristic curve to an extent that favors a high level of shifting comfort, as described later.

Figure 6:
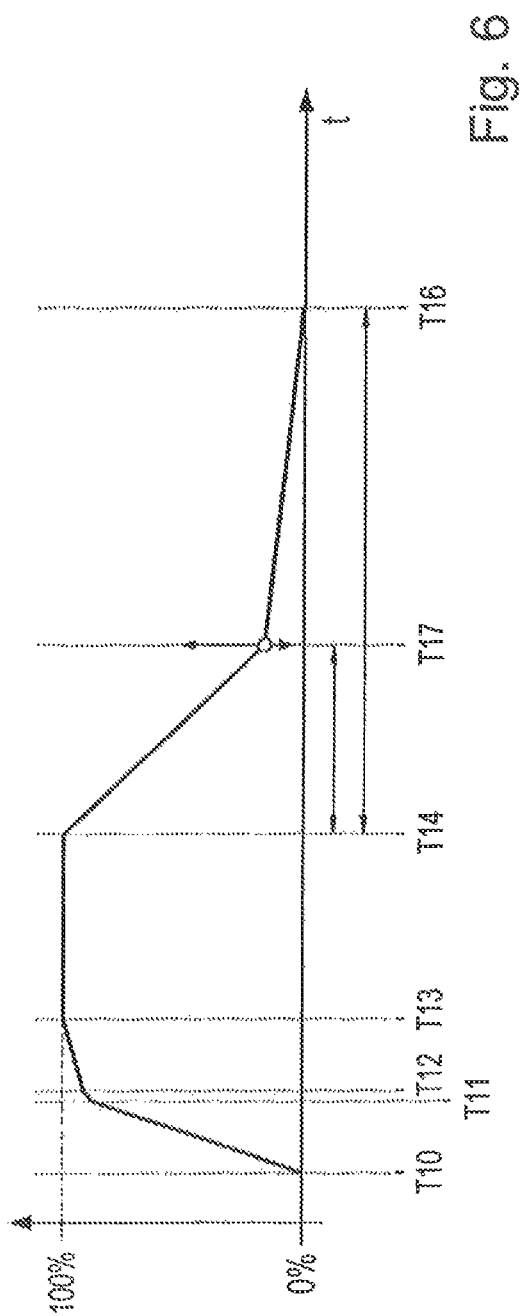
FIG. 6: A representation corresponding to FIG. 5, of a variation of a filling extent of the shifting element of the transmission according to FIG. 2, wherein the area of the characteristic curve that pictures the draining behavior of the shifting element is determined by way of a second variant of the method according to the invention.

The filling and draining characteristic curve of the shifting element 9 shown in FIG. 6 corresponds between time-points T10 and T14 essentially to the filling and draining characteristic curve shown in FIG. 5. The section of the filling and draining characteristic curve shown in FIG. 6 from time T14 onward is again determined by linear interpolation between the operating points of the shifting element 9. In this case the operating points of the shifting element 9 used for determining the characteristic curve according to FIG. 6 at times T14 and T16 correspond to the operating points of the shifting element 9 at times T14 and T16 used for determining the filling and draining characteristic curve according to FIG. 5. Only the operating point at time T17 used for determining the filling and draining characteristic curve shown in FIG. 6 differs from the operating point at time T15 used for determining the filling and draining characteristic curve according to FIG. 5.

The operating point at time T17 on which the determination of the filling and draining characteristic curve according to FIG. 6 is based, is defined by a residual filling extent of the shifting element 9 that exists after the lapse of a defined draining time, which in the present case begins after time T14 and lasts 3 s.

Figure 7:
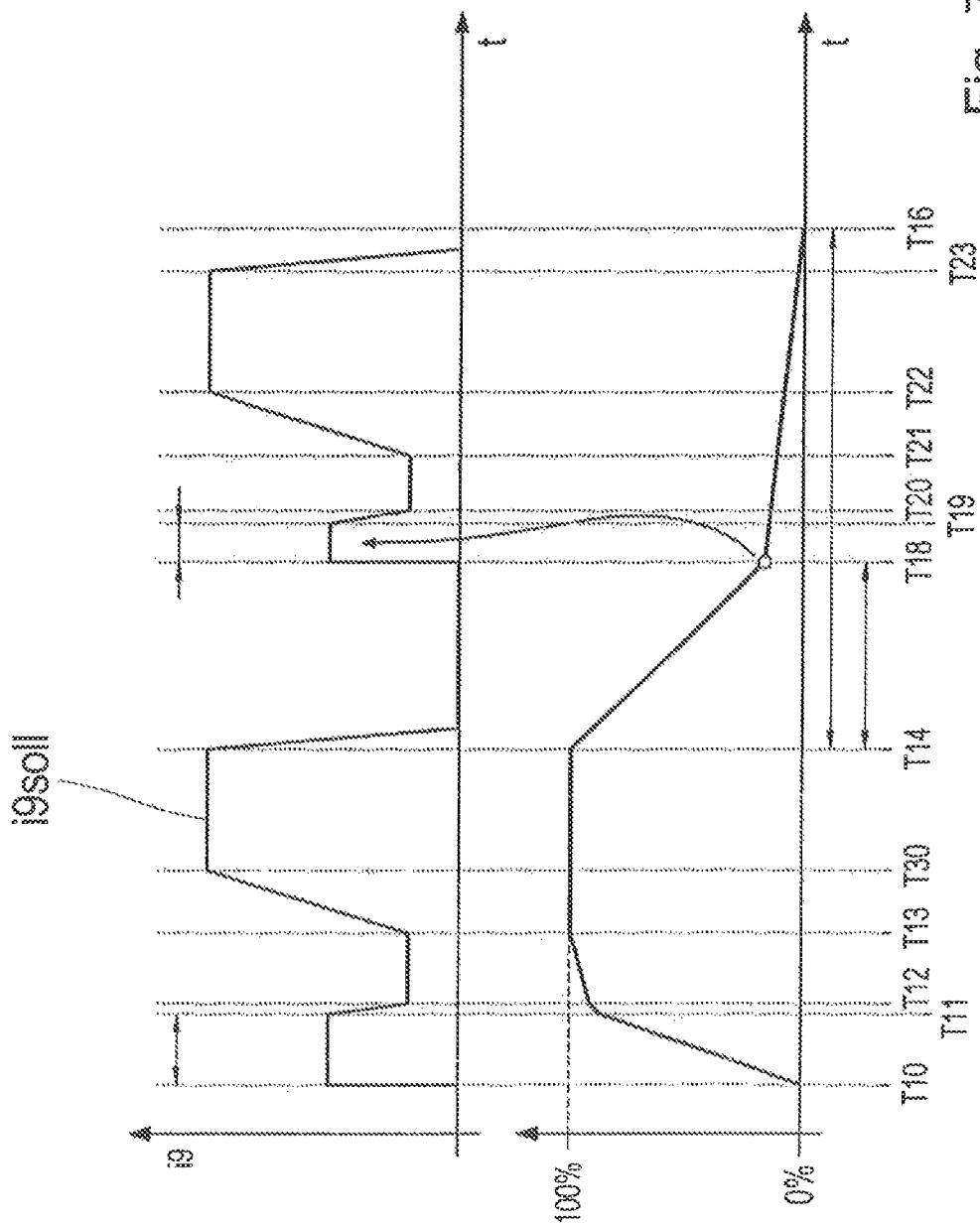
FIG. 7: A filling and draining characteristic curve corresponding to FIG. 5 or 6 for the shifting element of the transmission according to FIG. 2, and variations of two successive actuation phases of the shifting element, wherein the second actuation phase of the shifting element is adapted as a function of the filling and draining characteristic curve.

FIG. 7 shows a possible way of taking into account the calibrated residual filling behavior of the shifting elements 9 and 10 determined as described above, for an initial shift of a fully drained shifting element 9 or 10. In this case, FIG. 7 shows in an upper portion a variation of the nominal value i9$soll$ of the actuating current i9 as a function of time t during a rapid filling phase between times T10 and T11 and a subsequent filling equalization phase carried out between times T1 and T13. After time T13 the nominal value i9$soll$ of the actuating current i9 is increased in a ramp-like manner during a so-termed pressure modulation phase which in the present case lasts until a time T30, in order to bring the shifting element 9 or 10 to its fully closed operating condition.

At time T14 there again occurs a demand to disengage the shifting element 9 or 10, for which reason the nominal value i9$soll$ of the actuating current i9 is reduced along a ramp to the level necessary for the opening and draining of the shifting element 9 or 10. Accordingly, from time T14 the shifting element 9 or 10 drains to the extent shown by the filling and draining characteristic curve in the lower portion of FIG. 7. The characteristic curve shown in FIG. 7 can be constructed by linear interpolation in the manner described for FIG. 5 or 6.

After the lapse of a draining time of approximately 2 s, at time T18 a new demand arrives for engaging the shifting element 9. In accordance with the filling and draining characteristic curve according to FIG. 7, at time T18 the shifting element 9 or 10 still has a residual filling extent of about 25%. With the knowledge of this not-negligible residual filling extent of the shifting element 9, from time T18 the nominal value i9$soll$ of the actuating current i9 is only maintained for a time shorter by comparison with the interval between times T10 and T11, i.e. for a shorter rapid filling time lasting until a time T19, at the current value that corresponds to the rapid filling pressure, and at time T19 the current is reduced along a ramp to the level of the filling equalization pressure until time T20, and the shifting element 9 is acted upon by the corresponding rapid filling pressure.

At the end of the filling equalization phase, which in the present case is also shorter than the filling equalization phase between times T11 and T13, the shifting element 9 or 10 is again in its defined operating condition in which the transmission capacity of the shifting element 9 or 10 is essentially equal to zero and an increase of the actuating pressure of the shifting element 9 or 10 results in an immediate increase of its transmission capacity. In the present case the shifting element 9 or 10 reaches this operating condition at time T21, starting from which the nominal value i9$soll$ of the actuating current i9 is increased to the same extent as between the times T13 and T30 to the closing level of the shifting element 9 or 10, at which the shifting element 9 or 10 is acted upon by the closing pressure. Thereafter, in response to another demand the nominal value i9$soll$ of the actuating current i9 at time T23 is again reduced to the current value at which the shifting element 9 or 10 changes back to its open operating condition.

By means of the procedure described in detail with reference to FIG. 7, little effort is required to prevent the shifting element 9 or 10 from overfilling when a new engagement demand arrives because the shifting element 9 or 10 has not yet been completely drained, which overfilling due to the renewed engagement of the shifting element 9 or 10 would result in a shifting jerk that the driver would perceive as annoying.

In general, by virtue of the method according to the invention better shifting behavior is achieved during a rapid sequence of shifts of a shifting element by determining or calibrating the draining time. In addition, by implementing the method according to the invention in existing vehicle systems, for the first time scatter of the component tolerances of mass-produced components can be explicitly taken into account when actuating shifting elements of transmissions, and the shifting comfort improved thereby to a desirably large extent.

In addition, it is also generally possible that filling and draining characteristic curves of shifting elements are determined by other methods, such as heuristic, statistical or other procedures, in order to enable a shifting element to be actuated to the extent described above so as to achieve a better shifting quality.

INDEXES

1 Vehicle drive-train
2. Drive engine
3 Transmission
4 Drive output
5 Auxiliary drive output
6 Transmission input shaft
7 Fixed wheel
8 Further auxiliary drive output
9 Frictional shifting element
10 Frictional shifting element
11 Loose wheel
12 Loose wheel 13 Planetary carrier
14 Loose wheel
15 Double planetary gearwheels
16 First sun gear
17 Second sun gear
18 Ring gear
19 Shaft
20 First hydraulic unit
21 Hydrostatic unit
22 Fixed wheel
23 Fixed wheel
24 Shaft
25 Second hydraulic unit
26 Transmission output shaft
27 Frictional shifting element
28 Loose wheel
29 Fixed wheel
30 Fixed wheel
31 Fixed wheel
32 Frictional shifting element
33 Loose wheel
34 Fixed wheel
35 Shaft
36 Adjustable yoke
37 Electro-hydraulic control and regulation unit
38 Electric control unit
39 Valve device
40 Proportional pressure regulator
41 Valve slide of the proportional pressure regulator
42 Electromagnet
43 Spring device
44 Hydraulic amplifier
45 Control surface
46 Valve slide
i9 Actuating current
i9soll Nominal value of the actuating current
n11 Rotational speed of the shifting element half of the shifting element
n11_schwell Threshold value
p9 Actuating pressure
p_red Supply pressure signal
p_sys Supply pressure signal
T0-T30 Discrete time point
t Time

The invention claimed is:

1. A method for determining a draining behavior of a hydraulically actuated shifting element (9, 10) of a transmission (3), a first shifting element half of the shifting element being functionally connected to a transmission input shaft (6) that is couplable to a drive engine (2), and a second shifting element half of the shifting element being connectable to a drive output (4) of a vehicle drive-train (1) including the transmission, the method comprising:

when a rotation speed of the transmission input shaft (6) is greater than a threshold value and the second shifting element half is decoupled from the drive output (4), shifting the shifting element (9, 10) from a completely drained, open operating condition, by applying an actuating pressure (p9), to a completely filled, closed operating condition and determining a reference filling time (tf) until the completely filled, closed operating condition of the shifting element (9, 10) is reached;

recognizing the completely filled, closed operating condition of the shifting element (9, 10) when a rotational speed (n11) of the second shifting element half, that is connectable to the drive output (4), reaches a predefined threshold value (n11_schwell);

when the completely filled, closed operating condition of the shifting element (9, 10) is recognized, changing the shifting element (9, 10) to the completely drained, open operating condition by adjusting the actuating pressure (p9) for a predefined draining time to an appropriate level and, thereafter, changing the shifting element to the completely filled, closed operating condition;

when the completely filled, closed operating condition is recognized, again adjusting the shifting element (9, 10), in a direction toward the completely drained, open operating condition, by lowering the actuating pressure (p9); and before the shifting element (9, 10) reaches the completely drained, open operating condition, again changing the shifting element (9, 10) to the completely filled, closed operating condition, and determining the filling time until the partially drained shifting element again reaches the completely filled, closed operating condition.

2. The method according to claim 1, further comprising determining the reference filling time (tf) at least twice in succession.

3. The method according to claim 1, further comprising, after a lapse of a predefined draining time, again changing the shifting element (9, 10) to the completely filled, closed operating condition and, with reference to a ratio between the filling time and the reference filling time (tf), determining a filling extent of the shifting element (9, 10) after the lapse of the predefined draining time.

4. The method according to claim 3, further comprising iteratively carrying out the determination of the filling extent of the shifting element (9, 10) until the draining time, that corresponds to a predefined filling extent of the shifting element (9, 10), is determined.

5. The method according to claim 3, further comprising iteratively carrying out the determination of the filling extent of the shifting element (9, 10) until the draining time, required to reach the completely drained, open operating condition of the shifting element (9, 10), is determined.

6. The method according to claim 3, further comprising plotting a characteristic curve that depicts the draining behavior of the shifting element (9, 10) by linear interpolation between the completely filled and closed operating condition in which the shifting element (9, 10) is after a draining time equal to zero, the completely drained, open operating condition of the shifting element (9, 10) in which the shifting element (9, 10) is after the lapse of its draining time, and an intermediate value of the filling extent determined at a draining time that corresponds thereto.

7. The method according to claim 6, further comprising adapting at least one of a rapid filling time and a pressure level of the actuating pressure (p9) of the shifting element (9, 10), during a rapid filling phase of the shifting element (9, 10), by the characteristic curve to the filling extent of the shifting element (9, 10) determined by way of the characteristic curve at a beginning of the rapid filling phase.

8. The method according to claim 7, further comprising reducing at least one of the pressure level of the actuating pressure (p9) and the rapid filling time as a function of the respective filling extent of the shifting element (9, 10) determined at the beginning of the rapid filling phase.

9. The method according to claim 3, further comprising utilizing a characteristic curve that depicts the draining behavior of the shifting element in a form of a polynomial of a second order which is determined as a function of the completely filled, closed operating condition in which the shifting element (9, 10) is after a draining time equal to zero, the completely drained, open operating condition of the shifting element (9, 10) in which the shifting element (9, 10) is after the lapse of its draining time, and an intermediate value of the filling extent determined at a draining time that corresponds thereto.

10. The method according to claim 3, further comprising adapting the filling extent which corresponds to at least one of a predefined draining time of the shifting element (9, 10) and the draining time which corresponds to a predefined filling extent of the shifting element (9, 10), as a function of at least one of a rotational speed of the transmission input shaft (6) and an operating temperature of the transmission (3).

\* \* \* \* \*